(12) United States Patent
Clark et al.

(10) Patent No.: US 9,230,055 B2
(45) Date of Patent: Jan. 5, 2016

(54) METHOD OF OPTIMIZING FILM COOLING PERFORMANCE FOR TURBO-MACHINERY COMPONENTS

(75) Inventors: John Paul Clark, Dayton, OH (US); Jamie Jay Johnson, Beavercreek, OH (US); Michael Kenneth Ooten, Washington Township, OH (US)

(73) Assignee: The United States of America As represented by the Secretary of the Air Force, Washington, DC (US)

( * ) Notice: Subject to any disclaimer, the term of this patent is extended or adjusted under 35 U.S.C. 154(b) by 362 days.

(21) Appl. No.: 13/440,336

(22) Filed: Apr. 5, 2012

(65) Prior Publication Data

US 2013/0268244 A1 Oct. 10, 2013

(51) Int. Cl.
*G06F 17/50* (2006.01)

(52) U.S. Cl.
CPC ........ *G06F 17/5086* (2013.01); *G06F 17/5018* (2013.01); *G06F 2217/16* (2013.01)

(58) Field of Classification Search
CPC ............ G06F 17/5095; G06F 2217/10; G06F 17/5063; G06N 3/126; G06Q 10/06
USPC ............ 703/1, 8, 22, 2, 6, 10, 13, 12; 706/10, 706/13, 12
See application file for complete search history.

(56) References Cited

U.S. PATENT DOCUMENTS

| | | | |
|---|---|---|---|
| 5,375,973 A | 12/1994 | Sloop et al. | |
| 5,387,086 A * | 2/1995 | Frey et al. | 416/97 R |
| 5,538,393 A | 7/1996 | Thompson et al. | |
| 7,186,085 B2 | 3/2007 | Lee | |
| 7,223,072 B2 | 5/2007 | Riahi et al. | |
| 7,249,934 B2 | 7/2007 | Palmer et al. | |
| 2006/0029852 A1* | 2/2006 | Hirashige et al. | 429/30 |
| 2006/0229852 A1* | 10/2006 | Grichnik et al. | 703/2 |
| 2006/0247990 A1* | 11/2006 | Narayanan et al. | 705/35 |
| 2008/0021681 A1* | 1/2008 | Grichnik et al. | 703/2 |
| 2009/0083680 A1* | 3/2009 | McConaghy et al. | 716/3 |
| 2009/0138417 A1* | 5/2009 | Murakawa et al. | 706/13 |
| 2011/0161054 A1* | 6/2011 | Woolf et al. | 703/1 |
| 2012/0310618 A1* | 12/2012 | B'Far et al. | 703/13 |

OTHER PUBLICATIONS

Morrone et al. Optimization of a Gas Turbine Stator Nozzle Cooling Using Genetic Algorithms, Int. Symp. on Heat Transfer in Gas Turbine Systems, Sep. 14, 2009, Antalya, Turkey.*

(Continued)

*Primary Examiner* — Carlos Ortiz Rodriguez
*Assistant Examiner* — Scott S Cook
(74) *Attorney, Agent, or Firm* — AFMCLO/JAZ; Charles Figer, Jr.

(57) ABSTRACT

A method, apparatus and program product are provided to optimize film cooling performance for turbomachinery components. A design space is defined by selecting process variables and limits. A random initial population of a plurality of designs is provided using Latin hypersquare sampling, varying the process variables across the design space. Each design of the plurality of designs is evaluated. A fitness function value is determined based on a performance of each of the evaluated designs of the plurality of designs. A half of the plurality of designs having higher fitness function values is selected. Designs of the selected half of the plurality of designs are randomly paired to generate two new designs from each random pair of designs forming a plurality of new designs.

20 Claims, 15 Drawing Sheets

(56) References Cited

OTHER PUBLICATIONS

Shahpar, S., High Fidelity Multi-stage Design Optimization of Multi-stage Turbine blades using a Mid-range Approximate Method (MAM), 13$^{th}$ AIAA/ISSMO Multidisciplinary Analysis Optimization Conference Sep. 13-15, 2010, Forth Worth TX.*

Johnson, J.J., Optimization of a Low Heat Load Turbine Nozzle Guide Vane, Thesis, Department of Aeronatical and Astronautical Engineering, Mar. 2006.*

Roy, R., Adaptive Search and the Preliminary Design of Gas Turbine Blade Cooling Systems, Jan. 1997, University of Plymouth.*

Lu, Y., Effect of Hole Configurations on Film Cooling from Cylindrical Included Holes for the Application to Gas Turbine Blades, Dec. 2007 Louisiana State University.*

Roger, J.M., A Genetic Algorithm Based Optimization Tool for the Preliminary Design of Gas Turbine Combuators, Cranfield University, Nov. 2002.*

Han, J.C., Recent Development in Turbine Blade Film Cooling, International Journal of Rotating Machinery 2001, vol. 7, No. 1, pp. 21-40.*

Lee, K.D., Multi-objective Optiimization of Laidback Fan Shaped Fil—Cooling Hole Using Evolutionary Algorithm, International Journal of Fluid Machinery and Systems, vol. 3, No. 2, Apr.-Jun. 2010.*

Han, J.C., Effect of Film-Hole Shape on Turbine Blade Film Cooling Performance, NASA/CR-2000-209932.*

Colban, W.F., A Film-Cooling Correlation for Shaped Holes on a Flat-Plate Surface, Journal of Turbomachinery, Jan. 2011, vol. 133 [DOI: 10.1115/1.4002064].*

Morrone, B., Optimization of a Gas Turbine Stator Nozzle Cooling Using Genetic Algorithms, Int. Symp. on Heat Transfer in Gas Turbine Systems Aug. 2009, Antalya, Turkey.*

Hasanpour, A.H., Hole Configuration Effect on Turbine Blade Cooling, World Academy of Science, Engineering and Technology 49 2011 1-6.*

Mckay, M.D. et. al A Comparison of Three Methods for Selecting Values of Input Variables in the Analysis of Output from a Computer Code, Technometrics, vol. 42, No. 1, Special 40$^{th}$ Anniversary Issue (Feb. 2000), pp. 55-51, American Statistical Association and American Society for Quality. Down loaded from http://www.jstor.org/stable/1271432.*

Latin Hypercube Sampling: Defined, Wikipedia Archive Date Feb. 15, 2012 downloaded from http://en.wikipedia.org/w/index.php?title=Latin_hypercube_sampling&oldid=476986518.*

Coutandin, D., Optimization techniques applied to the design of gas turbine blades cooling systems, 23rd CADFEM User's Meeting 2005 International Congress on FEM Technology with ANSYS CFX & ICEM CFD Conference, Nov. 9-11, 2005, International Congress Center Bundeshaus Bonn, Germany.*

Weise, T., Global Optimization Algorithms—Theory and Application, Jan. 4, 2008.*

L. Darell Whitley. A genetic algorithm tutorial. Statistics and Computing, 4(2):65-85, Jun. 1994.*

Qu, M., Conjugate Heat Transfer Analysis and Design Optimization of Internally Cooling Turbine Blade, Applied Mechanics and Materials vols. 148-149 (2012) pp. 862-867.*

Ruiz, J.D., Thermal Design Optimization of Multi-passage Internally Cooled Turbine Blades: Masters of Science in Aerospace Engineering, The University of Texas at Arlington, Dec. 2008.*

* cited by examiner

| 1) MAIN FLOW CONDITIONS |
|---|
| 2) COOLING HOLE BLOWING RATIO |
| 3) SIMULATED COOLING HOLE VELOCITY PROFILES |
| 4) 3-D SURFACE SHAPE OF THE VANE |
| 5) COOLING MASS FLOW RATE (COMBINED AREA OF PS HOLES) |

| | | |
|---|---|---|
| 20 | SHOWERHEAD INJECTION ANGLE, α (deg) | 50°, 55°, 60°, 65°, 70°, 75°, 80°, OR 85° |
| | DOWNSTREAM PS INJECTION ANGLE, α (deg) | 15°, 20°, 25°, 30°, 35°, 40°, 45°, OR 50° |
| 22 | COMPOUND ANGLE, β (deg) | -60°, -30°, 0° (AXIAL), 30°, 60°, FAN OUT 30°, FAN IN 30°, PAIRED CROSSOVER AT 45° |
| | COOLING HOLE AREA | $2.027 \times 10^7$ m² TIMES 1.5 or 2.0; UP TO TWO DIFFERENT SIZES IN A ROW |
| | ROW PATTERNS | 32 (SEE FIG. 6) |

FIG. 3

| DIGITS IN EACH GENOME | 153 |
| --- | --- |
| GENOMES IN EACH GENERATION | 100 |
| NUMBER OF GENERATIONS | 13 |
| MUTATION PROBABILITY | 0.0013 |
| INITIALIZATION METHOD | LHS |
| TYPE OF CODING | BINARY |
| RECOMBINATION METHOD | RANDOM—1, 3, 5, OR 7 POINTS IN A STRING |
| MAXIMUM NUMBER OF POTENTIAL COOLING ARRAY DESIGNS | $0.32 \times 10^{552}$ |

| PROFILE-AVERAGED MAIN FLOW $T_{t,in}$ | 442.38 K |
|---|---|
| PROFILED-AVERAGED MAIN FLOW $P_{t,in}$ | 4.46 atm |
| PROFILE-AVERAGED MAIN FLOW $P_{s,ex}$ | 2.68 atm |
| MAIN FLOW $M_{in}$ | 0.11 |
| ID COOLING FLOW $T_{t,in}$ | 278.27 K |
| ID COOLING FLOW $P_{t,in}$ | 4.63 atm |
| OD COOLING FLOW $T_{t,in}$ | 243.24 K |
| OD COOLING FLOW $P_{t,in}$ | 4.67 atm |
| WALL TEMPERATURE (ISOTHERMAL COND.) | 316.42 K |

METHOD OF OPTIMIZING FILM COOLING PERFORMANCE FOR TURBO-MACHINERY COMPONENTS

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention generally relates to gas turbine engines and, more particularly, optimization of film cooling configurations therefor.

2. Description of the Related Art

Gas turbines, also called combustion turbines, are a type of internal combustion engine. They have an upstream rotating compressor coupled to a downstream turbine, and a combustion chamber in-between. Energy is added to a gas stream in the combustor, where fuel is mixed with air and ignited. In the high pressure environment of the combustor, combustion of the fuel increases the temperature. The products of the combustion are forced into the turbine section. There, the high velocity and volume of the gas flow is directed through a nozzle over the turbine's blades, spinning the turbine which powers the compressor and, for some turbines, drives their mechanical output. The energy given up to the turbine comes from the reduction in the temperature and pressure of the exhaust gas. Energy can be extracted in the form of shaft power, compressed air or thrust or any combination of these and used to power aircraft, trains, ships, generators, or even tanks.

Contemporary and next generation gas turbine engines generally demand that high pressure turbine ("HPT") inlet temperatures be ever-increasing to allow for higher thrust-to-weight ratio and thermodynamic efficiency. This requires that durability measures for turbine components continue to meet the challenge and keep pace with the trend of increasing hot gas temperatures in the engine. For decades, this has been done with high-temperance materials, thermal barrier coatings, and cooler air flow that is routed from the upstream compressor through the inside passages of the component. The last of these durability measures, internal convective cooling, becomes film cooling when the coolant is leaked through small holes in an airfoil wall and out onto an external surface. Film cooling has afforded the greatest leaps in gas turbine engine performance and durability, allowing engines to operate at temperatures beyond the material limits of their components. Active external cooling is required to achieve adequate part life for these configurations. Thus, cooling may be applied to high temperature components at a penalty to the efficiency of the engine.

The purpose of film cooling in any turbomachinery is to protect the material surface of components at the location of cooling injection as well as downstream. Film cooling works by using a fraction of the ambient flow going into the engine from a bypass fan near the compressor and routing it internally through the inside of the HPT components, allowing it to escape through small cooling holes in the surface where it interacts with the mainstream hot engine flow. As the main flow mixes with the cooler injected flow, a film is created over the material surface. The introduction of a secondary fluid into the boundary layer at a temperature lower than the mainstream results in a reduction of the material surface temperature in the region downstream of the injection. In the right pressure gradients, the additional cooling mass flow also provides a thicker boundary layer and greater insulation from potentially-damaging hot flow. Generally, a two-dimensional array of discrete cooling holes on the component surface allows for a coalescence of film cooling coverage over the component. While slots have shown to have the greatest cooling effectiveness downstream from the injection location, rows of discrete cooling holes provide the necessary structural integrity for the increased thermal stress environment of a HPT in addition to the beneficial additive nature of cooling effectiveness due to repeating rows, relative to single or sparsely-spaced holes.

Continual advances in computing power have afforded greater capabilities in computational fluid dynamic (CFD) simulations for a turbomachinery designer. But even with these advances reliable simulation tools, physical models, and all-encompassing turbomachine design methods that consider individual 3-D geometries, pertinent flow conditions, and whole film cooling arrays in the process are not fully developed or available. Currently, design practices related to film cooling configurations involve a high amount of empiricism and may be missing important physical behaviors that have direct impacts on durability, especially for the hottest part that sees the harshest environment, the HPT. Industry proprietary methods tend to use non-dimensional dated film correlations that assume analytical cooling performance at one span (usually mid span) will be the same at all spans. The 3-D nature of HPT component surfaces and local effects of the film cooling array are not factored into durability designs for individual parts. This prohibits accurate knowledge of thermally-driven stresses for a specific part given its unique geometry. Unfortunately, due to the intense compute power required, CFD codes are typically not used in the process of film cooling design. While industry has taken advantage of contemporary computing power to design for optimal aerodynamic shapes and structural design, the same cannot be said for film cooling design. Accordingly, there is a need in the art for a design methodology including 3-D CFD simulations for improving film cooling of turbomachinery components.

SUMMARY OF THE INVENTION

A method, apparatus and program product are provided to optimize film cooling performance for turbomachinery components. Embodiments of the invention define a design space by selecting process variables and limits. The embodiments provide a random initial population of a plurality of designs using Latin hypersquare sampling, varying the process variables across the design space. Each design of the plurality of designs is evaluated. Fitness function values are determined based on a performance of each of the evaluated designs of the plurality of designs. Half of the plurality of designs having higher fitness function values is selected. The embodiments of the invention randomly pair designs of the selected half of the plurality of designs to generate two new designs from each random pair of designs forming a plurality of new designs.

In some of the embodiments, each design of the plurality of designs is represented by a multidigit binary bit string. In these embodiments randomly pairing includes copying the multidigit binary bit string of a first design of the randomly paired designs to a random crossover point in the multidigit binary bit string. The remaining digits of the copied multidigit binary bit string are filled in with the multidigit binary bit string of a second design of the randomly paired designs to create a first new design of the plurality of new designs. A second new design may be created by copying the multidigit binary bit string of the second design of the randomly paired designs to the random crossover point in the multidigit binary bit string and filling in the remaining digits of the copied multidigit binary bit string with the multidigit binary bit string of the first design of the randomly paired designs.

In some embodiments of the invention, a subset of new designs of the plurality of new designs may be randomly mutated. In some of these embodiments, the subset of new designs of the plurality of new designs is mutated by changing a digit of the multidigit binary bit string of each new design of the subset of new designs of the plurality of new designs to the other of a one (1) and a zero (0).

Additional objects, advantages, and novel features of the invention will be set forth in part in the description which follows, and in part will become apparent to those skilled in the art upon examination of the following or may be leaned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 3 is a table containing film cooling process variables and possibilities for optimization;

Figures 1, 2:
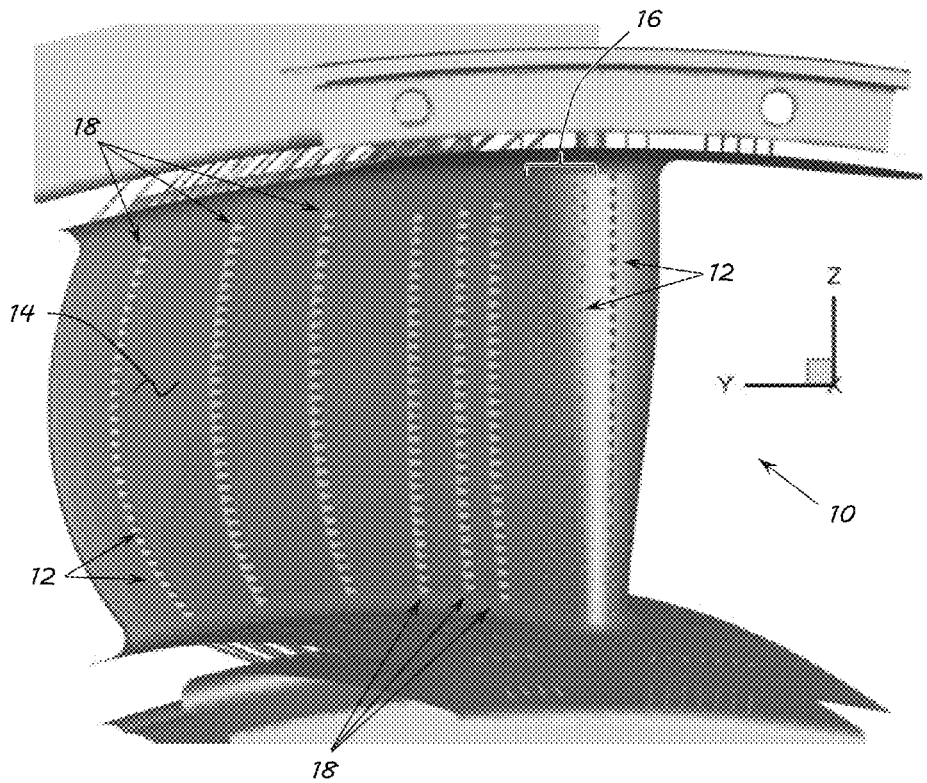
FIG. 1 is a prospective view of an exemplary turbine vane.
FIG. 2 is a table containing film cooling control variables for optimization.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Contemporary high pressure turbine (HPT) durability design methods in industry generally utilize dated correlations and spreadsheet methods based on "rules of thumb". Of the over 2,700 film cooling references in existence, no known efforts have been made towards an optimized overall film cooling design for a realistic HPT vane geometry in proper flow conditions. Nor has there been a major attempt in open literature to improve component cooling design methods in general. This work invests greater effort in the design and optimization of a HPT vane film cooling array by way of considering numerous configurations, variables, and variable value ranges within a design space. Cooling hole surface location, size, injection orientation, and row patterns may be varied in the design space. In some embodiments of the invention, the design space may be optimized by way of Latin hypercube sampling (LHS) and multi-objective genetic algorithms (GAs) to maximize cooling effectiveness and minimize area-averaged heat transfer over a pressure surface (PS) of a baseline nozzle guide vane. Full-map PS heat transfer predictions from 3-D computational fluid dynamics (CFD) simulations that efficiently approximate the cooling hole physics may be used in some embodiments with prescribed fitness functions to arrive at a much improved PS cooling array design.

Embodiments of the invention utilize three-dimensional CFD as a rigorous assessment tool of candidate designs in concert with modern optimization techniques in order to generate new custom-tailored film cooling designs within a practical amount of processing time. Designs produced using methodology of the embodiments of the invention may be efficiently generated by simulating the cooling flow as pressure inlet boundary conditions for a CFD model at the holes locations for that particular design, much like a transpiration boundary condition.

Using the methodology of the embodiments of the invention allows a durability designer to take a unique HPT component shape along with its unique cooling mass flow requirements, perform quick turn-around CFD simulations for surface heat transfer properties, and optimize using LHS and GAs on the surface film cooling hole configuration by exploring a number of critical variables and prescribed variable ranges while minimizing damaging impacts of high temperature gases. This allows for a great many potential durability designs to be evaluated with sufficient rigor resulting in a truly tailored, full-coverage film cooled part. Contemporary, state-of-the-art durability design methods do not allow for such 3-D designs a priori. Instead, 3-D film hole distributions are achieved through a trial-and-error process that involves testing parts and adding cooling where regions of distress are measured. This process is typically performed only at mid-span on a given part. Thus, the methodology of the embodiments of the invention has substantial advantages with respect to reducing design cycle time and decreasing development costs.

An exemplary airfoil design to be utilized to illustrate the methodology of some of the embodiments of the invention is a High-Impact Technologies Research Turbine Vane (HIT RTV) 10. This vane is a modern, high-turning vane with over 280 film cooling holes 12 on the pressure side 14 alone, nominally arranged with three showerhead rows 16 and six rows 18 of evenly spaced shaped holes as seen in FIG. 1. This configuration will be used as a starting point for the optimization of the film cooling array on the pressure side 14. The optimization will be performed on the pressure side 14 only as this surface is typically the hottest side of the vane 10 with the greatest number of cooling holes 12, receiving the highest velocity, hottest flows from the combustor in an airbreathing engine. The three-dimensional surface geometry of the vane 10 will not be changed for this exemplary airfoil 10, only the locations and orientations of the film cooling holes 12.

Optimization problems combined with objective functions and thorough evaluation applications have been used extensively since the early 1990s to solve design problems with multiple variables, reasonable constraints, and large design spaces. Many different optimization techniques and evaluation methods have been used. Popular optimization techniques include, but are not limited to, the use of evolutionary algorithms such as genetic algorithms (GAs) and multi-objective genetic algorithms (MOGAs), gradient-based methods, adjoint methods, sequential quadratic programming (SQP), artificial neural networks (ANN), simulated annealing (SA), or combination thereof. Each type of optimization has its advantages and disadvantages. Different types of optimization provide varying levels of convergence, reliability, and robustness. Ideally, an optimization should require the least number of time-consuming objective function evaluations. The number of function evaluations is equal to the number of intermediate designs in the process, which is the number of generations multiplied by the number of designs populating each generation. Overall, non-gradient-based optimizers, such as a GA, tend to have the ability to escape local maximum and minimums to search a large portion of an objective function space to find a global optimum. Conversely, GAs may take more computational time, have difficulties handling constraint functions, and tend to arrive at a family of very similar solution designs that may lack a level of desired diversity.

Embodiments of the invention may combine current turbine component durability design methods by using 3-D physics-based analysis techniques with heuristic optimization techniques to achieve a highly improved full coverage vane 10 PS 14 film cooling design. In some of these embodiments, using two-dimensional pressure surface maps of overall film cooling effectiveness ($\phi$) and surface temperature ($T_s$) as evaluated by a 3-D Reynolds-Averaged Navier-Stokes (RANS) CFD solver, film holes 12 modeled as discrete sources of mass flow, and a set of user-specified fitness functions, a GA can progress through successively improved cooling designs with each new population of designs. $\phi$ is defined by a ratio of hot freestream flow temperature ($T_\infty$) to surface temperature difference and freestream flow-to-coolant air temperature ($T_c$) difference:

$$\phi = \frac{(T_\infty - T_s)}{(T_\infty - T_c)} \qquad (1)$$

Since the vane 10 surface is usually hotter than the coolant air injected over it, this number is usually less than one. However, right on top of a cooling hole, $\phi=1$ and decreases steadily with surface distance until the next coolant injection location is reached. Generally, it is better to have a higher value over the surface of the vane 10.

Most comprehensive technical investigations typically start with some kind of design-of-experiments (DOE) methodology. Here, however, a DOE-type plan is staged for realistic comprehensive CFD simulations instead of experiments. In experiments, there are variables measured as output (responses) that are affected by changing one or more of the process variables. Process variables are those which are intentionally changed to produce some change in the output variables. Control variables are those that do not change between tests and have no effect on response variables. Noise variables, like turbulence in an experiment, introduce uncertainty into the results and their effects to response variables are not readily to process variables and as such their effects should be minimized. Each variable must be identified so that their interdependence can be studied. The response variables ($\phi$, $T_s$) are those whose output is calculated in the simulation as a result of the assigned boundary conditions and cooling configuration for a given run. It is these variables that are essential to calculating each intermediate design's fitness. In an experiment, these would be the variables that are measured or observed.

In optimizing film cooling for a gas turbine, there are certain fluid flow variables and physical hole attributes that affect film cooling performance significantly more than others. These variables may include mass flux ratio, momentum flux ratio, hole shape, injection angle, compound angle, and surface curvature, among others. In some embodiments, the external flow conditions and the cooling blowing ratio may be held constant for the optimization. Due to the estimation of cooling flux in the CFD, it is similar to having a constant cylindrical cooling hole shape, even though the real vane has shaped holes downstream of the showerhead region. The implications of modeling the shaped holes with more symmetrical-velocity-profile cylindrical holes are set forth in more detail below. Nevertheless, all holes are subject to this change, allowing valid comparisons between designs. The blowing ratio does change spatially over the vane PS 14 due to the fact that coolant is fed by two different plenums with different measured conditions, and this is simulated in the CFD as well. The 3-D shape of the vane is constant for the optimization as well—there is no shape-changing for this illustrated embodiment though the 3-D shape of the vane may be a design variable for optimization in other embodiments. The other primary control variable in the optimization is the combined PS cooling mass flow rate, which is managed by maintaining the total cross-sectional cooling hole area for the entire surface as cooling hole sizes change. The table in FIG. 2 summarizes the control variables for this illustrated embodiment.

As a result of the control variables, process variables chosen in the current optimization for individual film cooling holes may include: injection angle, compound angle, two-dimensional surface hole location on the vane PS, row pattern, and cooling hole size, among others. The table in FIG. 3 summarizes the process variables and variable ranges prescribed for the optimization in this illustrated embodiment. Injection angle 20 is the angle of cooling relative to the surface, or the lift-off angle. Compound angle 22 is the angle from the axial direction in the surface plane that the cooling injection is turned. There are eight options for available in the optimization for injection 20 and compound 22 angle in the showerhead (first three rows) as well as the pressure side region downstream. A negative compound angle means the cooling flow is directed towards the inner diameter. As set out above for the illustrated embodiment, hole size is allowed to change in the optimization only as long as total mass flow rate of cooling for a given row is kept constant, though other embodiments may allow for varying mass flow rates of cooling for rows as hole sizes change. Thus, the area variability is given in the table rather than the diameter variability. There are four options for hole size available in the optimization.

The ranges imposed on the variables are partly based on lessons learned from film cooling literature and values that are very common in practice with limits assigned make physical sense as well. Regarding the physical basis, for example, $\alpha$ is typically around 30°, and this is allowed to vary between 15° and 50°. Anything less than $\alpha=15°$, and the injection angle becomes close to being parallel with the flow which makes it difficult to manufacture, creates highly sharp edges, and undesirable structural shapes. The following concepts are generally known by those of ordinary skill in the art and may be useful in directing the focus of an optimization of PS film cooling:

- There are reasonable ranges of injection angle 20, compound angle 22, hole spacing within a row, row spacing, hole length-to-diameter ratio (irrelevant in this study), and blowing ratio (irrelevant in this study) that should be adhered to.
- Shaped holes perform far better than cylindrical holes in most arrangements and should be placed in the region downstream of the leading edge.
- At the leading edge, cooling performance is based mostly on high injection angles for mixing with the stagnated head-on flow (i.e. showerhead).
- Downstream of the leading edge, compound angle cooling provides better coverage than axial cooling.
- Staggered double rows perform better than single rows for cooling effectiveness.
- Taylor-Gortler vortices often disrupt film cooling near the hub and shroud of the vane PS 14, causing hot streaks.

Figure 4:
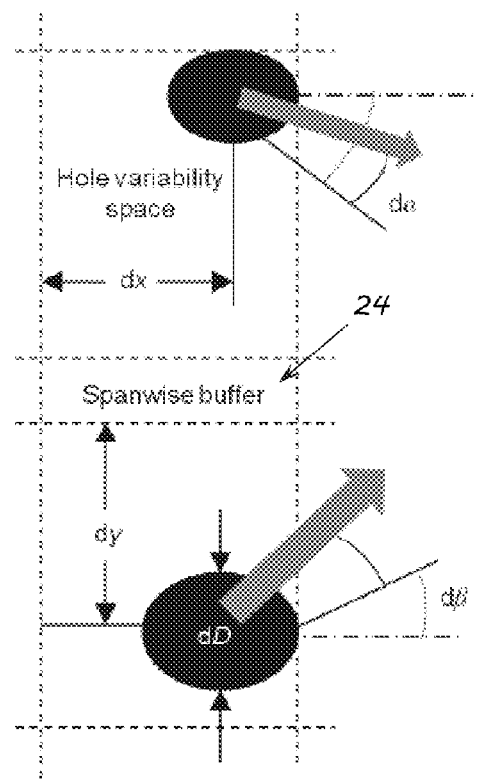
FIG. 4 is a detailed view of two neighboring pressure side cooling holes illustrating potential for variability for the optimization.
Figure 5:
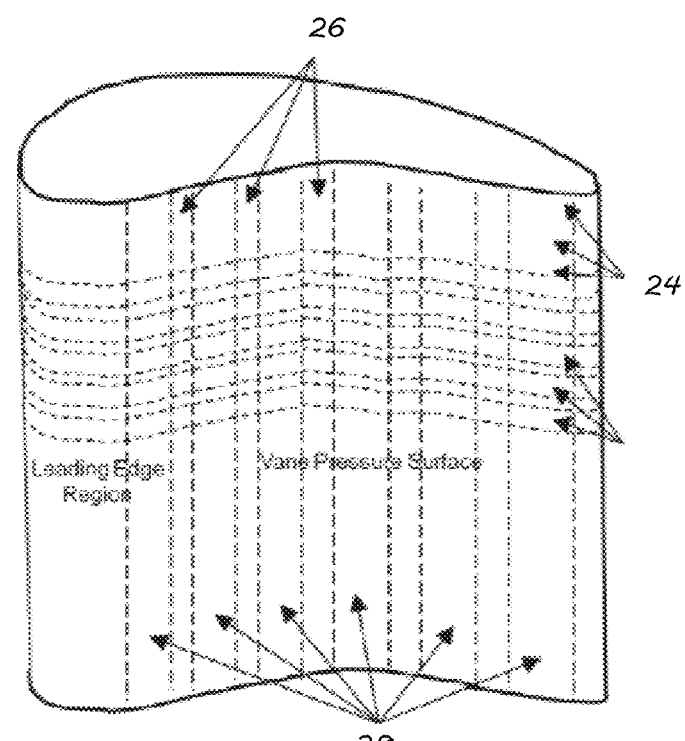
FIG. 5 is a prospective view of an exemplary turbine vane illustrating pressure side cooling hole location streamwise and spanwise variability plan for an array optimization problem.

FIG. 4 illustrates a potential variability due to the chosen process variables for two neighboring cooling holes within a row on the PS 14. A spanwise buffer 24 serves to ensure as the hole locations vary, they do not overlap or touch, nor do they create an unrealistically close pair. FIG. 5 illustrates spanwise buffers 24 as well as streamwise buffers 26 appear on the entire PS 14 of the vane 10. The streamwise buffers 26 serve the same purpose as the spanwise buffers 24. After calculating spatial locations of these buffers 24, 26 based on the available area, axial and radial potential hole locations may be checked to be sure they lie within these limits. Note, the exemplary baseline RTV cooling configuration illustrated in FIG. 1 has six rows of holes 18 in the region downstream from the showerhead 16. Because static pressure may vary slightly over the pressure surface 14, the optimized cooling array redesign was allowed six main streamwise sectors 28 that are centered on the locations of the baseline configuration's rows for this illustrated embodiment, though other numbers of streamwise sectors may also be used. This allows freestream static pressure seen by exiting cooling air to vary only a small amount as a cooling hole's or row's surface locations are changed in the optimization process. Generally, there will be less variability in the radial direction for a hole relative to axial changes due to space constraints. The six sectors 28 seen in FIG. 5 each have approximately the same amount of space to work within the optimization.

Figure 6:
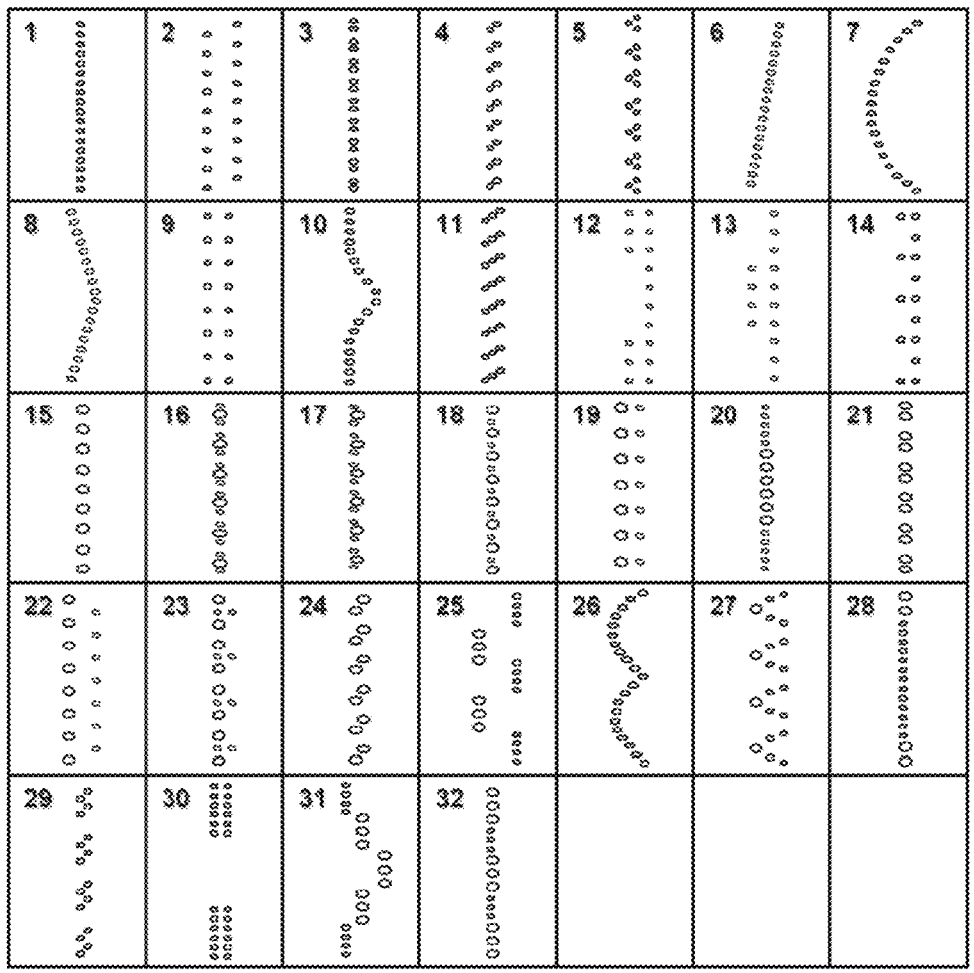
FIG. 6 is a table containing film cooling row patterns considered in an optimization process.

Predefined hole patterns available the optimization methodology of embodiments of the invention may be placed in any one of the six sectors seen in FIG. 5. These patterns allow the optimization to try a high number of different combined PS cooling arrays and evaluate the combined effects of multiple patterns over a surface. In addition, within each pattern, there may be axial and radial hole location variability that can change a given pattern dramatically, depending on the amount of variation attempted. Certain patterns also have hole size variability as well. All patterns use injection 20 and compound 22 angle variability. The compound angle 22 variability available to the patterns is unique in that all holes in a pattern can have the same parallel angle, or they can have a gradual inward-fan or outward-fan orientation in which the midspan compound angle is axial ($\beta=0$) with a gradual symmetrical change towards the inner diameter (ID) and outer diameter (OD), depending if its an outward or inward fan. Some patterns have the ability to implement a paired-crossover compound angle orientation where every pair of holes has injection that intersects. A top down view of the cooling injection vectors would show an "X" in this case. Also, a few patterns had custom-designed $\beta$ variability, like pattern numbers 11 and 27, where every local group of holes has their own fan-out, fan-in, or fan-to-one-side orientation. The table in FIG. 6 shows all 32 patterns implemented for the optimization in the illustrated embodiment, though other embodiments may use more or fewer patterns. For each of the patterns in the table in FIG. 6, flow is assumed to be left to right. There are two discrete hole size changes used in this illustrated embodiment, 1.5 and 2.0 times the original size. Only some patterns may use both hole sizes. Most of the patterns were designed based on the prior-mentioned known concepts, such as the fact that staggered double rows and sister holes tend to perform very well. Some patterns focus cooling towards the outer edges of the vane, some focus cooling at midspan. The number of holes in a row pattern may be conserved relative to the baseline cooling configuration, however with larger holes present, depending on how many, smaller holes may be subtracted in order to conserve the combined row cooling hole area (i.e. mass flow rate). FIG. 6 is not meant to show all holes in an implemented pattern, it just shows enough holes to recognize the pattern intended.

Figure 7A:
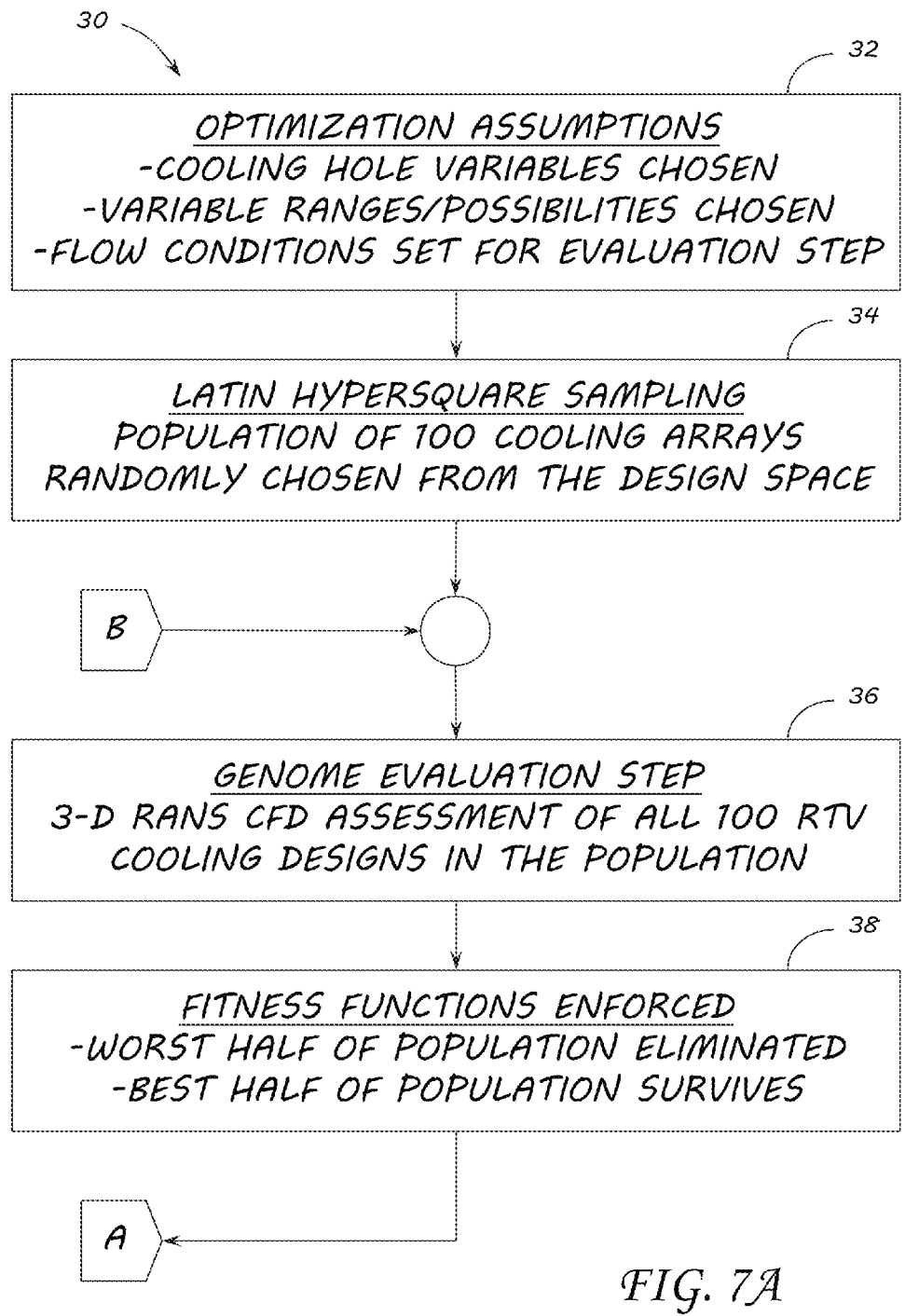
FIGS. 7A and 7B contain a flowchart for a genetic optimization algorithm.
Figure 7B:
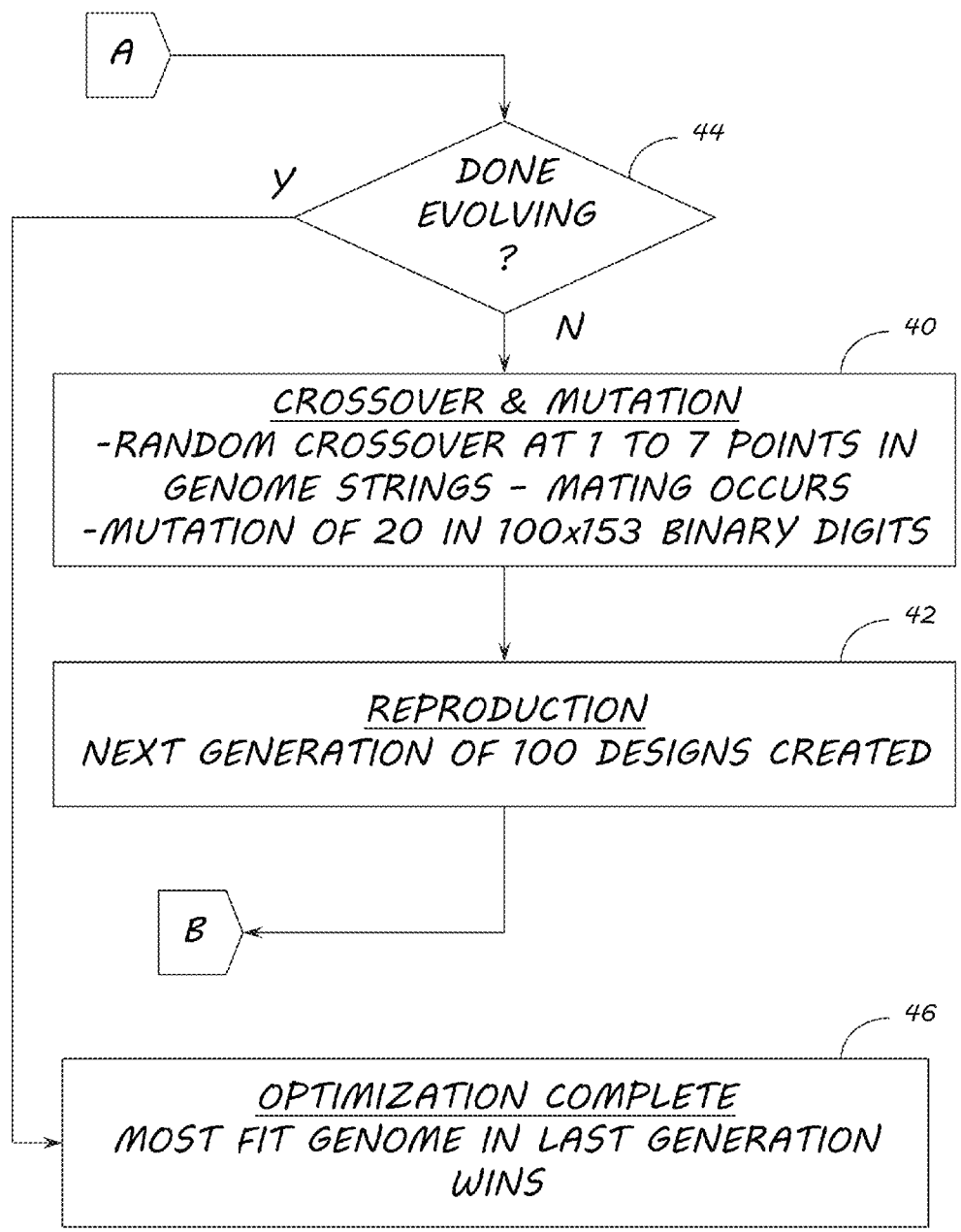

The illustrated embodiments utilize genetic algorithms (GAs) for optimization of the cooling design, though other algorithms may also be used for optimization. GAs are a process for function optimization that mimics the genetic reproduction process experienced by biological organisms 44. The goal of the GA process is to find the best global design available. FIGS. 7A and 7B contain a flow chart 30 of the optimization process for this embodiment. The optimization starts after the process variables are chosen 32, the ranges or discrete possibilities of those variables are assigned, and the boundary conditions of the CFD fitness-evaluation are set. Latin hypersquare sampling (LHS) 34 occurs next to provide a random initial population of approximately 600 designs, or genomes, that have attributes that vary dramatically from across the design space. Each genome is represented by a binary digit bit string. Each new population of 100 genomes is referred to as a generation. Next, every genome and its unique cooling design in the original population may be evaluated 36 using many thousands of iterations of converged 3-D RANS CFD, for example. From this, 2-D PS maps of $\phi$ and $T_s$ are obtained to determine the overall cooling performance of each genome. Next, the fitness functions can be enforced 38 based on the performance of each genome. From this, the best half of the genomes with the highest fitness values are kept and the worst half of the population is eliminated. This is the feedback function of the process. Then, crossover, or the mating step occurs 40. Mating happens by copying the first genome in the pair up to a random crossover point in its binary string and filling in the remaining digits with the binary identifiers from the second genome in the pair and vice versa, making two brand new genomes. Because it occurs in nature as well, mutation is allowed to occur in the form of a bit string digit flip from 0 to 1 or vice versa. Mutation occurs randomly for 20 binary digits in every generation. The probability of mutation is low (0.13%) since there are 100 genomes in a generation and a total of 153 binary digits in every genome. Once a new generation is created 42 from the parents and respective children produced by crossover, the designer may decide whether to continue evaluating populations of genomes 44. Once the last generation is reached, based on user preferences, the optimization comes to an end 46. Therefore, in the flow chart 30, for only the last generation, the optimization completes directly after the fitness values are calculated based on the CFD. Assuming the average fitness of every new generation has increased, an essential sign of a working GA and good fitness function, the best genome in the last generation may be chosen as the optimized cooling array design.

Figures 8, 9:
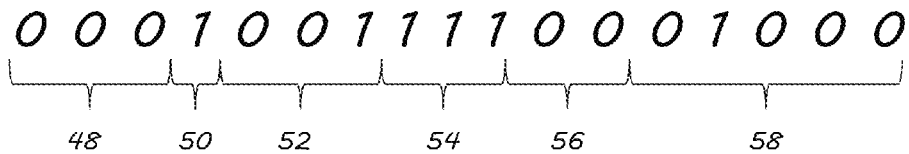
FIG. 8 is a sample bit string for a single row of cooling holes with an implemented pattern in the vane pressure side optimization study.
FIG. 9 is a table containing a summary of optimization specifications for an embodiment of the invention.

Each genome is 153 binary digits because the variable of nine total cooling hole rows on the vane PS are combined to represent one cooling design. For example, three showerhead rows and six downstream PS rows are optimized in this illustrated embodiment. The showerhead rows only vary in terms of injection and compound angle, and the row patterns do not affect these holes. The downstream PS rows vary through all process variables available. Each row has 17 binary digits assigned to it, thus with nine total rows on the PS, there are 153 digits for every cooling design genome. FIG. 8 shows how a cooling hole row is identified as a bit string and broken up into its process variables: axial location 48, radial location 50, injection angle 52, compound angle 54, diameter (size) 56, and pattern 58. By calculating two to the exponent of the number of digits represented by a variable, it can be found how many discrete possibilities are available in the optimization. For example, five digits represent the row patterns, so $2^5=32$ available patterns 58. Injection angle 52, compound angle 54, and axial location 48 may vary for $2^3=8$ possibilities in every row. Hole size, or diameter 56, may vary for $2^2=4$ possibilities in every row and radial (spanwise) location 50 may vary for $2^1=2$ discrete possibilities. Thus, the reasoning can be seen for the parameter possibilities listed in the table in FIG. 3. The table in FIG. 9 summarizes the primary specifications for the optimization for this illustrated embodiment.

Careful implementation of a user-specified fitness function in evaluating designs may result in a significantly improved cooling design in minimum time by using the process of natural selection to improve the set of parameters, or genes, that describe the PS cooling array. As discussed above, the GA is not perfect, as it is susceptible to mutations and elitism, which makes the nature of the fitness function critical to its success. One goal of the particular fitness functions enforced in this illustrated embodiment is to minimize surface temperature over as much of the PS 14 of the vane 10 as possible. Another goal is to spread out the cooling by taking cooling away from over-cooled areas and redistributing it to hot areas as indicated by the performance of the baseline cooling configuration. Using turbine durability engineering experience and judgment, the equations considered in every genome's fitness evaluation from the CFD may include:

$$\text{fitness}_1 = \phi_{aavg} \tag{2}$$

$$\text{fitness}_2 = 1-(T_{s,max}-T_{s,min})/(T_\infty-T_c) \tag{3}$$

$$\text{fitness}_2 = 1-(T_{aavg}-T_{s,min})/(T_{s,max}-T_{s,min}) \tag{4}$$

$$\text{overall fitness} = (\text{fitness}_1 + 2*\text{fitness}_2 + \text{fitness}_3)/4 \tag{5}$$

Equation (2) suggests that higher values of $\phi$ are the better. The second part of the fitness, equation (3), considers the difference between the maximum and minimum surface temperatures as found by the CFD on the vane 10 for the particular cooling design considered, divided by the difference between freestream and coolant air temperatures. This is intended to decrease the maximum temperature on the surface. Equation (4) is intended to lower the average surface temperature on the vane PS. After a cross-correlation check for sensitivity, it was found that equations (2) and (4) correlate very closely. However, for the overall fitness, it is still desirable to utilize both equations. But, in order to not overshadow the relative effects of fitness equation (3), it was decided to multiply the equation (3) by two in equation (5) for this illustrated embodiment, though other weightings of equation (3) may also be used.

LEO, a 3-D Reynolds-Averaged Navier Stokes solver produced by AeroDynamic Solutions, Inc. of Pleasanton, Calif., is used for all evaluations within the optimization. The discretization scheme used is called the Ni scheme, based on the Lax-Wendroff scheme, and is second order in space and time. It is an explicit finite-volume solver for the structured RTV grids that uses implicit residual smoothing to speed up convergence, implicit dual time-stepping, and the Wilcox 1998 k-ω turbulence model. The flow in this illustrated embodiment is assumed to be steady, though other embodiments may have varying flow. All flow cases are run to 24,000 iterations which was found to provide sufficient convergence of residuals of density, momentum and energy to 0.001 or less. Every individual cooling design within the population of each generation went through this 3-D viscous CFD assessment. A generation of genomes was evaluated by the CFD in twelve hours time. The fluid in the simulations is air and it is assumed to be an ideal gas.

Figure 10:
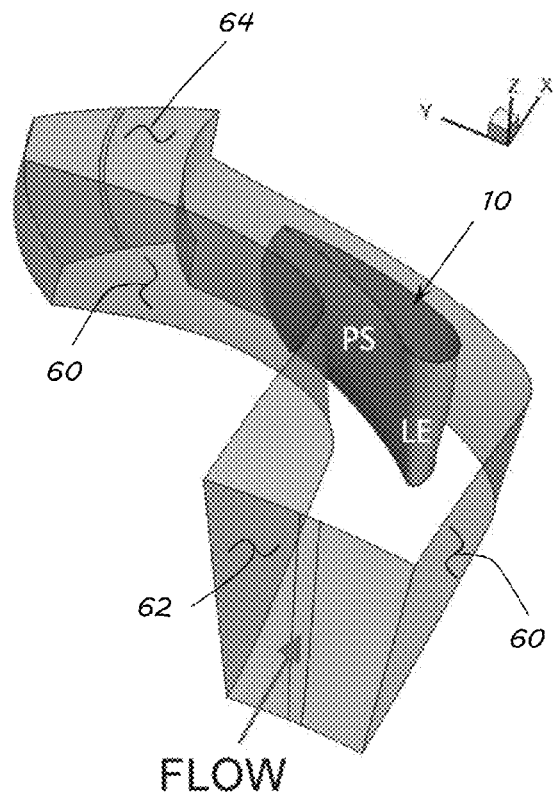
FIG. 10 is a diagram illustrating a computational domain for a turbine vane highlighting the pressure side and leading edge.

The 3-D CFD domain may be an axially-shortened $\frac{1}{23}^{rd}$ tangential sector of an annular Turbine Research Facility (TRF) passage, tangentially centered on a vane, as there are 23 vanes in the full wheel. The TRF is a full-scale experimental blowdown rig designed to obtain time-accurate unsteady pressure, surface temperature, and surface heat flux data from various installed single shaft turbine hardware designs. It operates with a typical useful run time of 2.5 seconds at flow conditions that are non-dimensionally consistent with the turbine environment. No rotating components are simulated. The computational domain starts approximately 10 cm upstream of the vane and ends 10 cm downstream of the vane trailing edge. This corresponds to 2¼ axial chord lengths in front of and behind the vane 10. Inlet and outlet locations also correspond with positions of upstream and downstream pressure and temperature instrumentation rakes. Concerning boundary conditions, the hub wall, shroud wall, and vane surface are set to solid no-slip surfaces, the sides of the domain 60 are periodic, and the inlet 62 and outlet 64 are configured as a pressure inlet and outlet, respectively. FIG. 10 shows the computational fluid domain used for all CFD runs.

The RTV design was initially defined by splining seven cross-section shapes each at different spanwise locations. SOLIDWORKS® produced by Dassault Systemes SolidWorks Corp. of Waltham, Mass., was used to create a 3-D stack-up of the vane. Extrapolated root and tip two-dimensional geometries were added to ensure the 3-D vane extended past the ID and OD walls for cropping in SOLIDWORKS® to ensure a contiguous geometry for grid generation. The exemplary RTV 10 was previously designed for optimum aerodynamic performance. The vane 10 has an axial chord length of 4.52 cm and a turning angle of 76.88 degrees. This baseline cooling configuration has six showerhead 16 rows of smaller cylindrical cooling holes on the leading edge, four rows of laidback fan-shaped holes on the suction side (SS), and six rows 18 of similarly shaped holes on the pressure side (PS) 14. There only two different cooling hole shape-size combinations on the entire vane 10, one for the showerhead 16, the rest for the PS 14 and SS. The showerhead 16 holes have a compound angle of 90° towards midspan, depending on which side of midspan a given hole is on, and an injection angle of 30°. This means leading edge cooling is injected at an angle perpendicular to the mainstream flow, with a cool streak coalescing at midspan. All PS 14 and SS holes have axial orientation with a local injection angle of 30°. The vane 10 has a design blowing ratio near the leading edge of 1.5.

Figure 11:
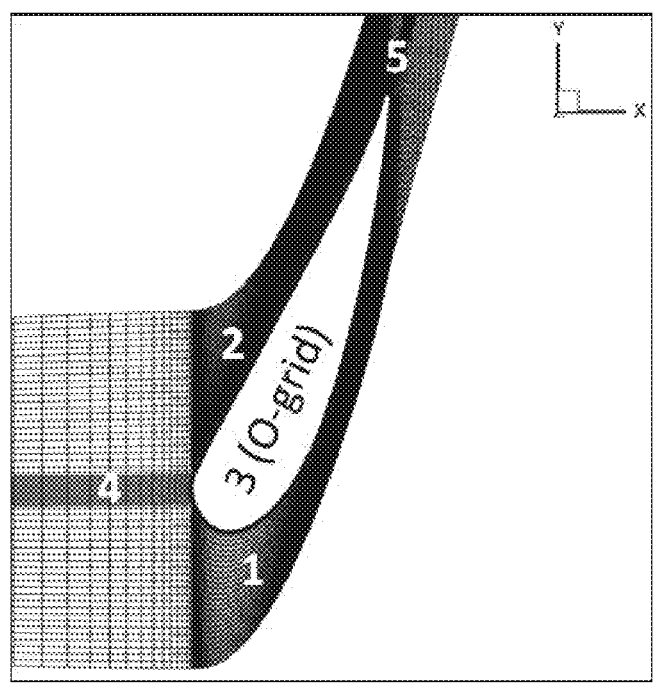
FIG. 11 is a mid-span slice of the computational domain of FIG. 10 showing grid blocks for vane flow path simulations.
Figures 12, 13:
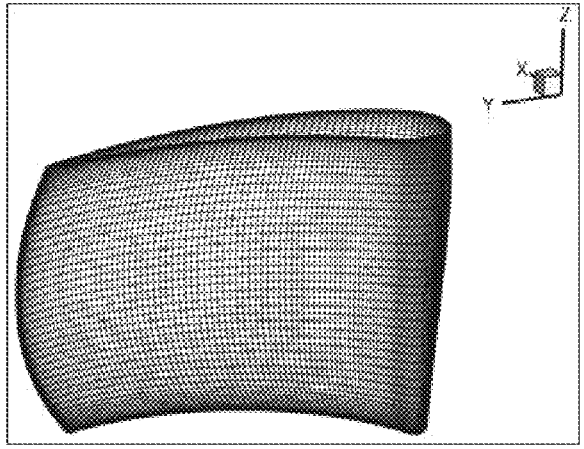
FIG. 12 illustrates a structured grid resolution as seen on the pressure surface of the turbine vane.
FIG. 13 is a table containing matched experimental conditions for all 3-D computational fluid dynamic evaluations in the optimization.

A CFD mesh was generated using WAND also created by AeroDynamic Solutions, Inc. Only automatically-generated structured meshes were used in this work. WAND is a text-based grid generator that forms structured grids from a given 3-D geometry. An O-mesh was generated around the airfoil close to the surface with H-meshes created for the upstream and downstream passage centerline, and in the remainder of the passage. The meshes do not overlap. The wall-normal dimension of the O-mesh as well as the initial grid cell height around the airfoil was specified. A total of five blocks was used in the domain, including an upstream centerline block, downstream centerline block, O-grid block, PS block and SS block, as seen in FIG. 11. The final grid chosen for the optimization has 1,146,880 grid cells in the computational domain. FIG. 12 shows the structured resolution of the grid chosen for the vane 10. There were 177 grid cells in the axial direction and 65 cells spanning from ID to OD.

The table in FIG. 13 lists the CFD conditions kept constant for all runs in the optimization. All CFD evaluations assume an isothermal vane surface, hub, and shroud boundary condition. The surface temperature for the isothermal condition was taken from the reading from a single flush-mounted thermocouple from the instrumented uncooled vane. The reason for the isothermal condition is with 3-D non-conjugate CFD that only models the external flow, there are only adiabatic or isothermal conditions to choose from. The TRF does not run adiabatically and uses conducting materials that would exist in a real gas turbine engine. In addition, data analysis has shown that the rig runs much more isothermally, and likely does not reach a steady state of conduction within the short run time of 2.5 seconds. Since there is differing ID and OD coolant supply conditions for the vane in real life as well as for the CFD, some rows (three leading edge showerhead rows and the first two pressure side rows) see the ID-fed conditions listed in the table in FIG. 13 and the remaining downstream rows see the OD-fed pressure and temperature coolant conditions. Unlike airfoil or wing design, turbomachinery components, especially stators, do not require a design that works well in a wide variety of flow (off-design) conditions, thus, the dependence on one set of conditions. GAs do not as easily escape local minimums in problems with dynamic environments or changing conditions, but that is not the case here as a typical turbine vane sees little variation in flow conditions.

Since the 3-D CFD evaluations only examine the external flow field, each individual cooling hole shape is irrelevant in the optimization and therefore is not considered as a process variable. This is made possible by a CFD boundary condition technique that approximates the cooling injection using additional flux terms for grid cells on the surface of the vane that coincide with cooling hole locations. This evaluation method is therefore efficient because it bypasses the requirement of full grid CFD assessments or the incorporation of real-time computer-aided-drafting (CAD) file updating and subsequent 3-D mesh generation with every new design due to changes in individual cooling hole shapes. Instead, the method used for this illustrated embodiment focuses on aggregate surface cooling performance with little use for the detailed flow fields in and around the cooling holes.

Figure 14:
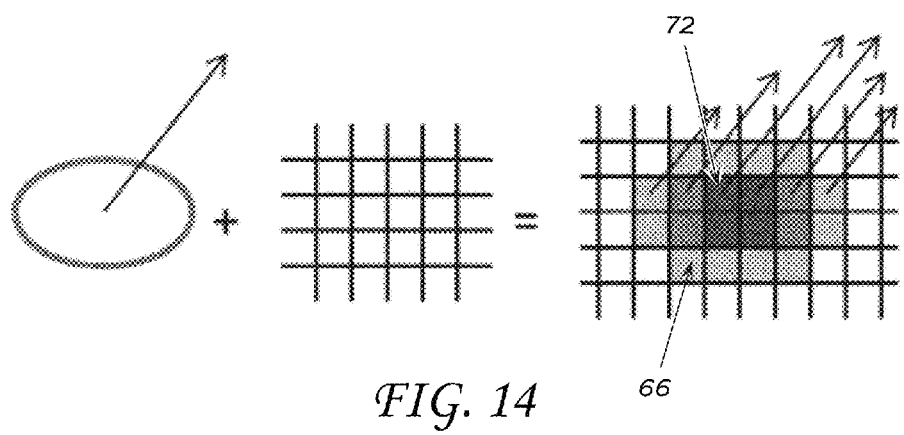
FIG. 14 is an illustration of source-term cooling flux injection estimation at surface grid cells.

The film-cooling inlets on the surface of the vane and its endwalls were modeled by adding a source term to the governing equations on grid cells in the vicinity of injection locations. This technique is simple as it requires no grid adaptation at the site of cooling holes. Also, this method is requires much less computational time relative to full-grid CFD or conjugate heat transfer modeling. Depending on the grid refinement, many cells may have added source terms for a given cooling hole. The cells toward the outside of the hole exit have a lower cooling mass flux than the cells in the center of the hole. All injection sites assume a symmetrical velocity profile at the exit plane like that of a cylindrical hole. So, since an actual shaped hole would have an asymmetrical velocity profile, this is one of the few differences from reality in this kind of cooling flux estimation. There is no local refinement of the surface mesh near cooling holes, making all grid cells on the vane surface at the sites of cooling injection the same size. This transpiration boundary treatment of the cooling injection means there is only an external flowfield mesh. Individual hole passages are not gridded, nor are internal coolant plenums. WAND allows the user to specify the gas conditions, mass flow, location, size, and coolant injection orientation of all cooling holes for a given vane or blade being interrogated. An advantage of this method is that it is robust and can be applied independently of the flow regime in the main stream outside of the cooling hole. FIG. 14 illustrates the cooling flux estimation technique used in the CFD—the lighter shades of gray 66 are meant to show lower cooling flux towards the edges of cooling holes at the exit plane.

Figure 15A:
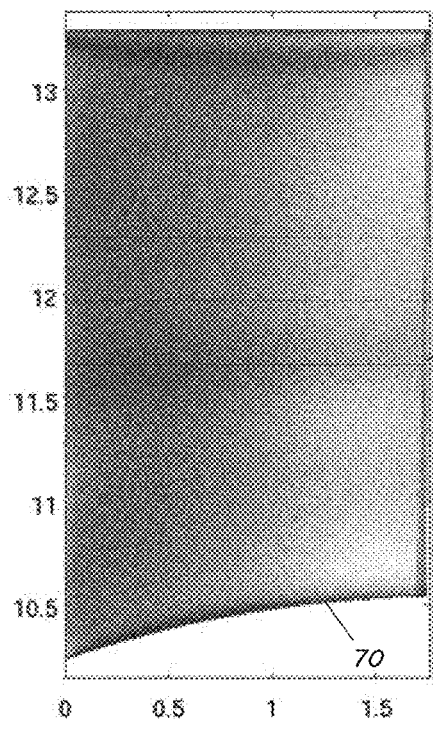
FIG. 15A illustrates an uncooled turbine vane pressure side surface temperature distribution.
Figure 15B:
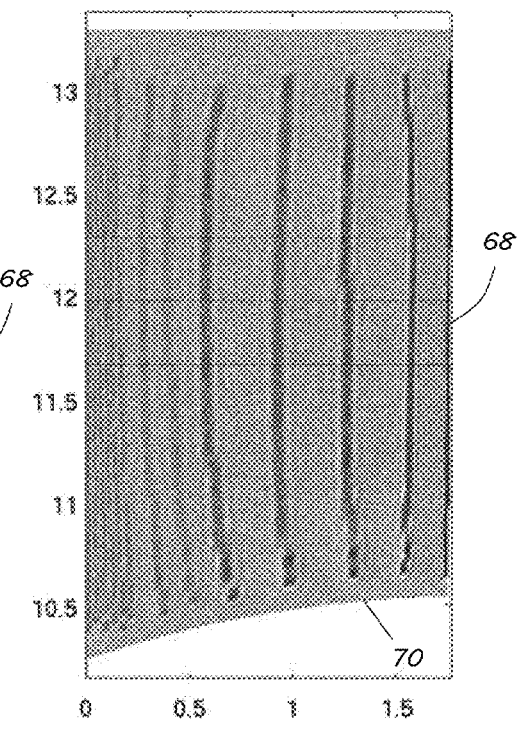
FIG. 15B illustrates resulting locations of cooling holes for baseline configuration of FIG. 15A as determined by transpiration boundary condition interpolation.

Translating the CFD results to pertinent fitness scores for each genome in each generation is important to the successful optimization process. First, looking at the baseline RTV cooling configuration in FIGS. 15A and 15B as a result of the non-dimensional uncooled PS temperature distribution (lighter grays are hotter), it can be seen that in a basic design, straight or slightly curved rows of holes are evenly spaced over the surface in order to properly spread out the film cooling. The uncooled contour, FIG. 15A, shows that the PS 14 without cooling gets hot near the trailing edge 68, especially near the hub, or ID 70. FIG. 15B shows how the transpiration boundary condition treatment for the film cooling flux at the surface approximates or interpolates the locations of cooling holes at the surface. This is analogous with FIG. 14 that shows darker gray 72 areas where there is a higher concentration of cooling flux.

During the development of the CFD assessment within the optimization, it was found that attempting to evaluate relative cooling array designs using the surface temperature and overall effectiveness calculated right at the surface created contours with little or no discernable features. This observation was expected as the CFD simulations have an isothermal surface setting. Therefore, instead of using the heat transfer properties from the first fluid cell next to the no-slip surface, the properties were calculated at the $10^{th}$ cell from the surface, or the "j=10" location. At j=10, the flow features were for more detailed than at j=1 and provided good heat transfer contours for enforcement of fitness functions. The j=10 location physically lies only 2.79e-5 meters from the surface, making it a sensible representation of simulated surface heat transfer characteristics for all genomes in the optimization.

Figures 16A, 16B:
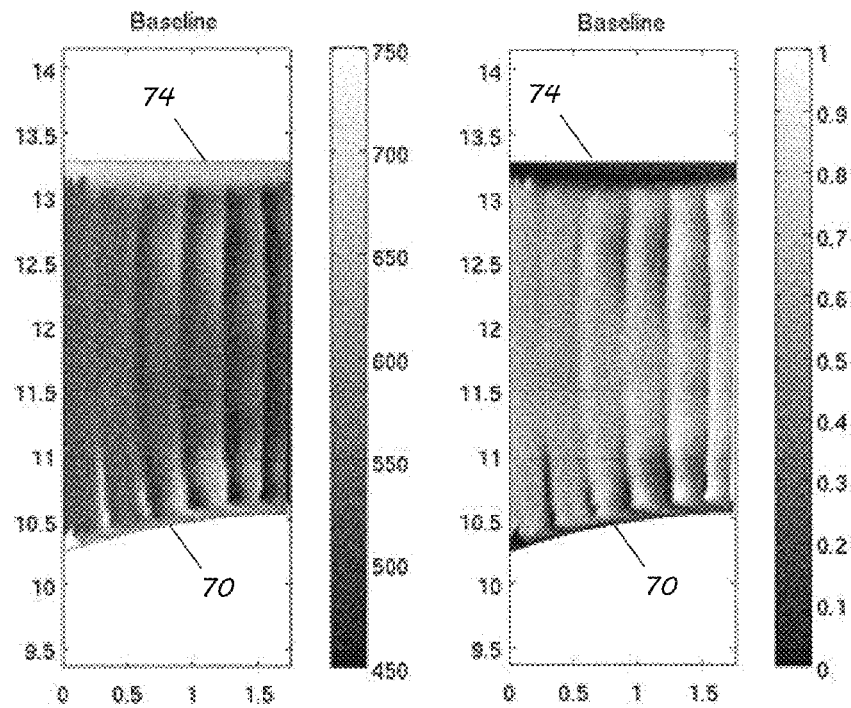
FIGS. 16A and 16B illustrate local surface temperature and local overall effectiveness due to a baseline cooling design.

FIGS. 16A and 16B show contour plots of surface temperature (16A) and overall effectiveness (16B) at the j=10 level for the RTV baseline cooling configuration as a result of the 3-D RANS CFD simulation with the design flow conditions. With surface temperature, the darker shades of gray in the plot are better. With overall effectiveness, lighter shades of gray in the plot are better. The 3-D nature of the flow over the PS 14 of the vane 10 can be seen in the features captured near the ID 70 and OD 74, which are both very hot relative to the rest of the surface. The OD 74 region appears to be the biggest problem area in terms of temperatures seen by the vane and will ultimately receive attention in the optimization process. There are also some hot spots in the 25% and 75% span areas just upstream of the cooling hole rows that are farther downstream on the surface. This phenomena of hot spots just upstream of cooling hole rows was also regularly seen in much more rigorous conjugate heat transfer full-grid CFD assessments recently completed for the RTV 10. This lends credibility to the use of the j=10 gird cell level in the fitness evaluation process. Clearly, the overall effectiveness very close to unity at the location of cooling air injection with decreases on the surface farther downstream until another row of holes is reached. It can be seen that surface temperature characteristics are generally the opposite of overall effectiveness, as seen in the OD 74 region where the temperatures are high and the cooling effectiveness is low.

Figure 17:
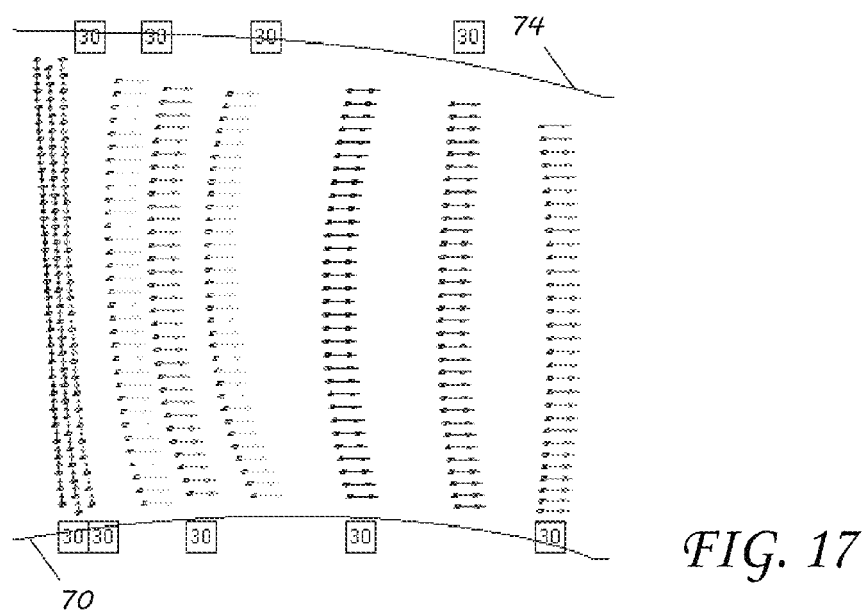
FIG. 17 is a vector plot for the baseline cooling array configuration illustrating axial compound angles, constant injection angles, and mid-span-oriented showerhead injection.

Vector plots were used between generation for visual assurance that cooling configurations generated from the optimizer were realistic and lie fully within the pressure surface of the vane. These plots also indicate the direction of cooling injection in the surface plane, or the compound angle, for each cooling hole. FIG. 17 shows the vector plot for the RTV baseline cooling configuration. The numbers in boxes on the plot indicate the injection angle in degrees for each of the nine rows on the PS. If the numbers in boxes is 55 or greater (not the case for the baseline array), this number represents the injection angle in degrees for the outer half of the span, then subtract 35 degrees to get the injection angle for the inner half of the cooling hole row. Inner half simply means the area between 25% and 75% span on the vane. The reason for this option in the optimization is the knowledge that the baseline array has high temperature regions at the ID 70 and OD 74, and that higher injection angles will best cool these areas. The baseline cooling design does not vary injection angle over the span, as seen in the plot, and all compound angles are oriented axially, making it a fairly simple design.

Figure 18:
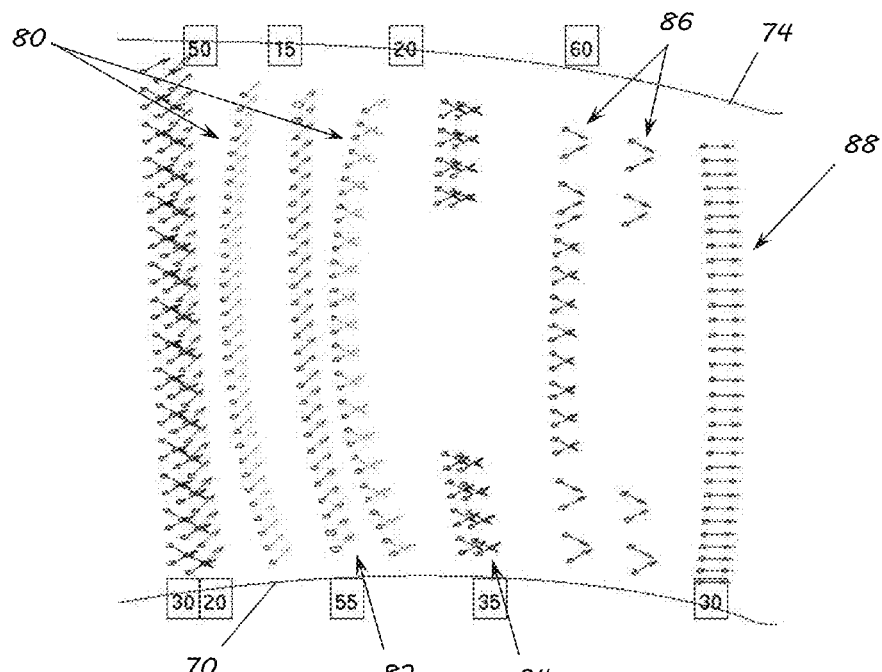
FIG. 18 is a vector plot for the optimized cooling array showing the use of patterns, varying injection and compound angles in the genetic-algorithm optimization.
Figures 19A, 19B:
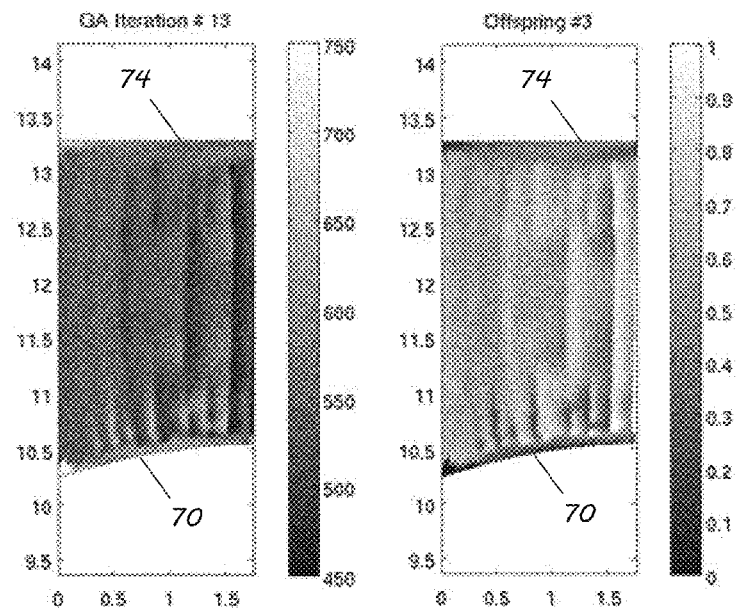
FIGS. 19A and 19B illustrate local surface temperature an local film-cooling effectiveness due to an optimized cooling design.

After 13 generations of cooling array designs for the RTV surface geometry and design-level flow conditions, an optimized configuration was selected. FIG. 18 is a vector plot of the optimized cooling design and FIGS. 19A and 19B are the contour plots for temperature and cooling effectiveness. The optimized cooling array has a number of unique features. Many of the nine rows employ the use of paired-crossover ("X"-shaped) compound angle injection 76. Many of the row use compound angles 78 toward the OD 74. The six row patterns determined by the optimization include: pattern 7 ($1^{st}$ and $3^{rd}$ rows) 80, pattern 28 ($2^{nd}$ row) 82, pattern 30 ($4^{th}$ row) 84, a mirror image of pattern 12 ($5^{th}$ row) 86, and finally pattern 6 ($6^{th}$ row) 88, which is a slanted row, but only very slightly, which may not appear to be so in FIG. 18 because the slanted row is placed on a curved surface. The optimization worked to take cooling away from the midspan region where on the baseline vane, cooling air piled up due to the showerhead orientation. It also worked to direct cooling flow as much as possible toward the OD 74 to counter the uncooled hot streak seen in FIG. 16B. Comparing FIGS. 16A and 16B with FIGS. 19A and 19B, these trends are also apparent. The optimized design performs very well spreading out the film cooling over the vane and avoids large hot areas. The overall hot-to-cold surface temperature extremes are significantly reduced on the vane as well. Lastly, even with the 4th row of cooling holes on the PS 14 lacking midspan holes, the existing cooling is sufficient to outperform the baseline array.

Figure 20:
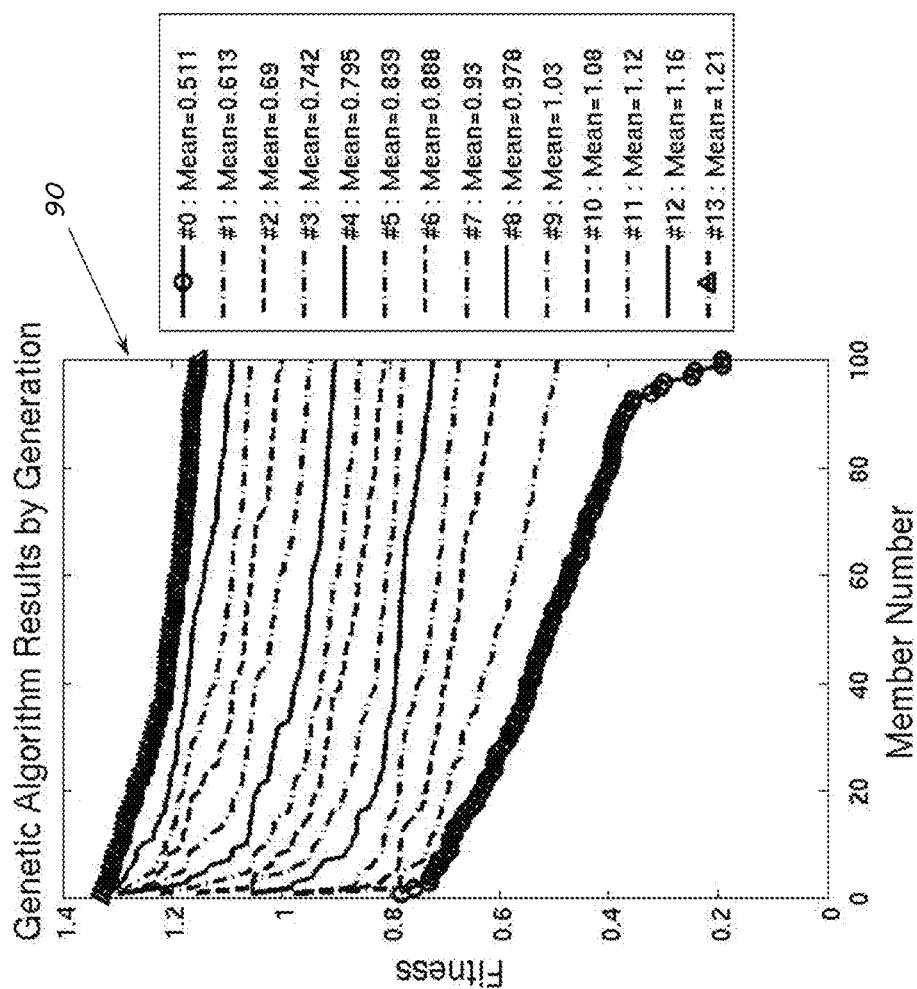
FIG. 20 is a graph illustrating fitness of the airfoil population by generation improved substantially over the course of genetic-algorithm optimization.

The last result of interest is the behavior of all genomes in each generation in terms of fitness. Graph 90 in FIG. 20 plots the relative fitness for all 13 generations in the optimizations normalized by the first population. The obvious trend is that given more generations, the fitness levels will asymptote towards some maximum relative fitness level. The variation between genomes in a generation clearly decreases with every new generation. So, as discussed above, genomes become more alike as the optimization progresses (elitism). However, with more optimization, there are diminishing returns. For this reason, the process was completed after 13 generations. This plot is intended to show the successful optimization, as there was a continual increase in average fitness, from 0.511 to 1.21, an improvement of 237%.

Figure 21:
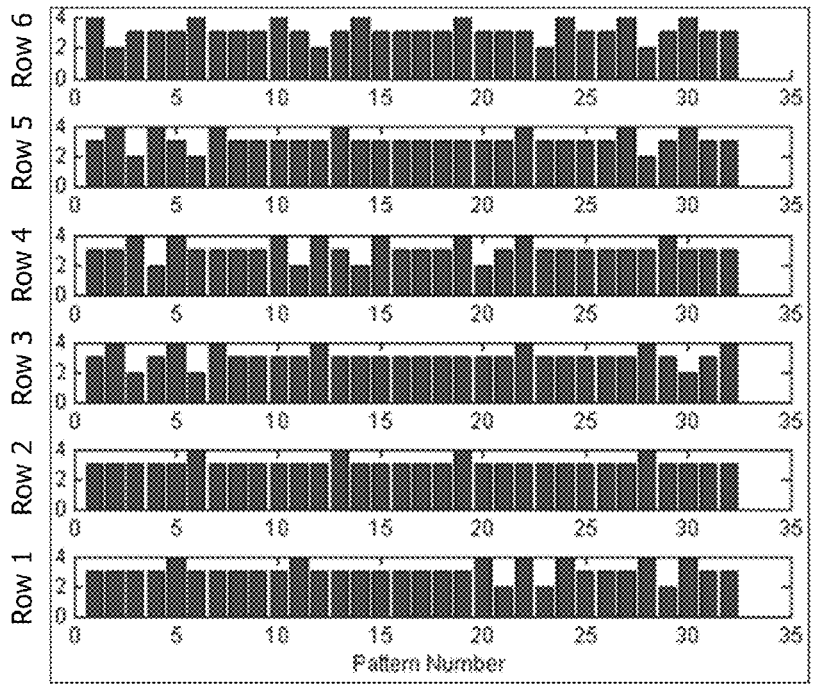
FIG. 21 is a histogram showing the distribution of the 32 film cooling row patterns of FIG. 6 for the six modified rows on the vane PS at the start of the optimization.
Figure 22:
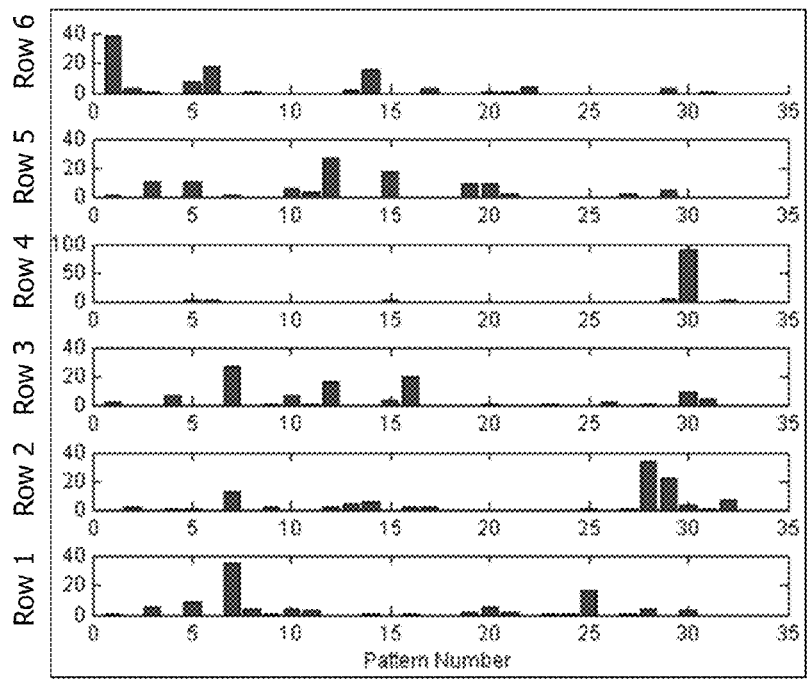
FIG. 22 is a histogram showing the distribution of the 32 film cooling row patterns of FIG. 6 for the six modified rows on the vane PS at the end of the optimization.

Histograms showing the distribution of pattern selection by row are provided in FIGS. 21 and 22 for the start and the end of the optimization, respectively. Pattern numbers may be referenced from FIG. 6. Row 1 is just downstream of the leading edge cylindrical showerhead holes 16 and Row 6 in near the trailing edge. FIG. 21 represents the pool of 100 parents in the first generation and FIG. 22 represents the 100 children in the last generation. At the start, it can be seen that there is a very even distribution of patterns to work with in the first generation and there is no clear bias towards any pattern in particular. By the end of the optimization, the optimization process has narrowed each vane PS cooling hole row to a handful of patterns that are useful in achieving proper prescribed fitness objectives based on the unique fluid physics at each location as estimated by the CFD as seen in FIG. 22. For example, some rows, such as row 4, exhibited a tighter preference towards certain patterns than other rows.

Figure 23:
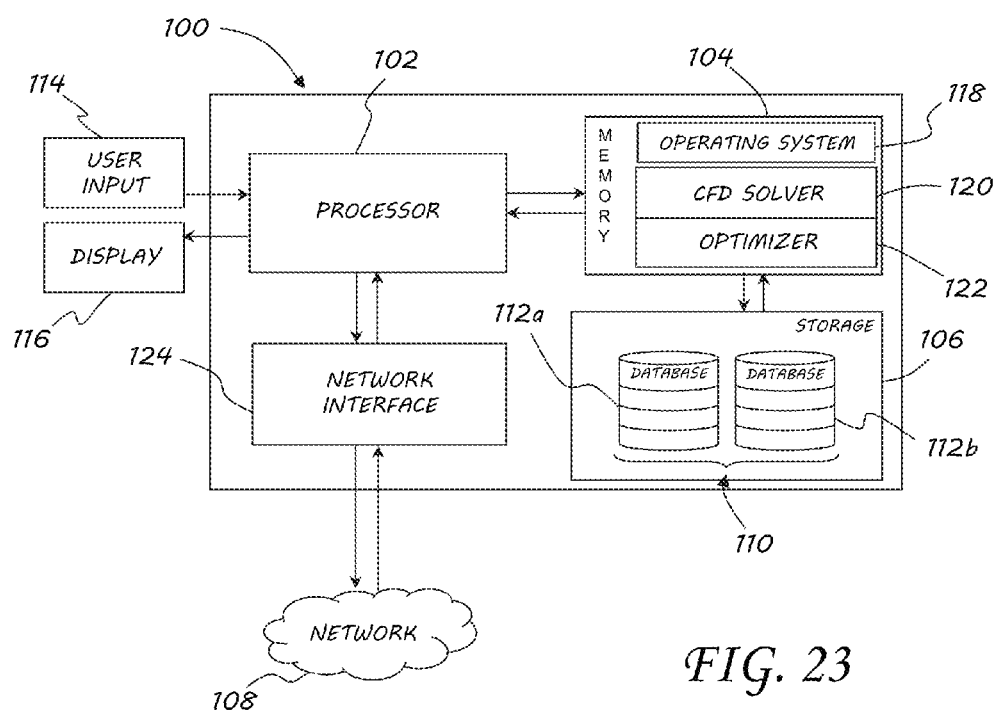
FIG. 23 is a diagrammatic illustration of an exemplary hardware and software environment for an apparatus configured to optimize film cooling of turbomachinery components consistent with embodiments of the invention.

CFD simulations and the optimization may be performed on an exemplary hardware and software environment, such as that illustrated in FIG. 23. For the purposes of the invention, apparatus 100 may represent practically any computer, computer system, or programmable device, e.g., multi-user or single-user computers, desktop computers, portable computers and devices, handheld devices, network devices, mobile phones, etc. Apparatus 100 will hereinafter be referred to as a "computer" although it should be appreciated that the term "apparatus" may also include other suitable programmable electronic devices.

Computer 100 typically includes at least one processor 102 coupled to a memory 104. Processor 102 may represent one or more processors (e.g. microprocessors), and memory 104 may represent the random access memory (RAM) devices comprising the main storage of computer 100, as well as any supplemental levels of memory, e.g., cache memories, non-volatile or backup memories (e.g. programmable or flash memories), read-only memories, etc. In addition, memory 104 may be considered to include memory storage physically located elsewhere in computer 100, e.g., any cache memory in a processor 102, as well as any storage capacity used as a virtual memory, e.g., as stored on a mass storage device 106 or another computer coupled to computer 100 via a network 108. The mass storage device 106 may contain a cache or other dataspace 110 which may include databases 112a and 112b, for example, which may contain CFD models, optimization data, available hole patterns, among others.

Computer 100 also typically receives a number of inputs and outputs for communicating information externally. For interface with a user or operator, computer 100 typically includes one or more user input devices 114 (e.g., a keyboard, a mouse, a trackball, a joystick, a touchpad, a keypad, a stylus, and/or a microphone, among others). Computer 100 may also include a display 116 (e.g., a CRT monitor, an LCD display panel, and/or a speaker, among others). The interface to computer 100 may also be through an external terminal connected directly or remotely to computer 100, or through another computer communicating with computer 100 via a network 108, modem, or other type of communications device.

Computer 100 operates under the control of an operating system 118, and executes or otherwise relies upon various computer software applications, components, programs, objects, modules, data structures, etc. (e.g. CFD Solver 120 and optimization algorithms 122). Computer 100 communicates on the network 108 through a network interface 124.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 23 is not intended to limit the present invention. Indeed, those skilled in the art will recognize that other alternative hardware and/or software environments may be used without departing from the scope of the invention.

The objectives of the illustrated embodiment were to optimize an existing modern film cooling array, resulting in a better film cooling on the vane PS, and offer a significantly improved and updated method for the general design of HPT component cooling hole arrays consistent with today's computational capabilities. Methodology within embodiments of the invention was shown to accomplish these objectives. While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of optimizing film cooling performance for turbomachinery components, the method comprising:
    defining a set of cooling hole designs, each design consisting of a predefined hole pattern including a plurality of different film cooling row patterns and placements which are a representative subset of a cooling hole pattern of an implementation pattern, and within each pattern there is axial and radial hole location variability;
    defining a design space by selecting process variables and limits for film cooling of turbomachinery components;
    defining sectors throughout the high pressure surface of a turbine vane,
    providing a random initial population of pressure side turbine vane cooling designs derived from the set of cooling hole designs by placing the implementation pattern represented by the predefined hole pattern of the cooling hole designs in any one of the sectors of the turbine vane;
    evaluating the film cooling performance of each design of the initial population of cooling designs;
    vary the process variables across the design space while iteratively performing in order:
        determining a fitness function value based on predicted heat transfer performance from 3-D CFD of each of the evaluated designs of the population of cooling designs, selecting a half of the population of cooling designs having higher fitness function values, randomly pairing designs of the selected half of the population of cooling designs to generate two new designs from each random pair of designs forming a new population of cooling designs, evaluating the film cooling performance of each design of the new population of cooling designs; and selecting a set of the cooling designs that maximizes cooling effectiveness and minimizes area-averaged heat transfer over the high pressure surface side of the turbine vane.

2. The method of claim 1, further comprising:

repeating the providing, varying, evaluating, determining, selecting and randomly pairing steps until the optimization process is complete.

3. The method of claim 1, wherein selecting limits for the process variables is selected from a group consisting of: defining a range for each of the process variables, defining discrete possibilities of each of the process variable, and combinations thereof.

4. The method of claim 1, wherein the evaluating comprises:

performing computational fluid dynamics simulations on each design of the plurality of designs.

5. The method of claim 1, wherein each cooling hole design in the set of cooling hole designs is represented by a multidigit binary bit string.

6. The method of claim 5, wherein the randomly pairing comprises:

copying the multidigit binary bit string of a first design of the randomly paired designs to a random crossover point in the multidigit binary bit string;

filling in the remaining digits of the copied multidigit binary bit string with the multidigit binary bit string of a second design of the randomly paired designs to create a first new design of the new population of cooling designs;

copying the multidigit binary bit string of the second design of the randomly paired designs to the random crossover point in the multidigit binary bit string; and filling in the remaining digits of the copied multidigit binary bit string with the multidigit binary bit string of the first design of the randomly paired designs to create a second new design for the new population of cooling designs.

7. The method of claim 6, further comprising:

randomly mutating a subset of new cooling designs of the new population of cooling designs by changing a digit of the multidigit binary bit string of each new cooling design of the subset of new cooling designs of the new population of cooling designs to the other of a one (1) and a zero (0).

8. The method of claim 1, wherein varying the process variables across the design space uses Latin hypersquare sampling.

9. An apparatus comprising: a memory; a processor; and a program code resident in the memory and configured to be executed by the processor for optimizing film cooling performance for turbomachinery components, that program code further configured to define a set of cooling hole designs, each design consisting of a predefined hole pattern including a plurality of different film cooling row patterns and placements which are a representative subset of a cooling hole pattern of an implementation pattern, and within each pattern there is axial and radial hole location variability;

define a design space by selecting process variables and limits for film cooling of a turbomachinery component;

defining sectors throughout the high pressure surface of a turbine vane, providing a random initial population of pressure side turbine vane cooling designs derived from the set of cooling hole designs by placing the implementation pattern represented by the predefined hole pattern of the cooling hole designs in any one of the sectors of the turbine vane;

evaluate the film cooling performance each design of the initial population of designs;

Varying the process variables across the design space; while iteratively performing in order:

determine a fitness function value based on predicted heat transfer performance from 3-D CFD of each of the evaluated designs of the population of cooling deigns, select a half of the population of cooling designs having higher fitness function values, randomly pair designs of the selected half of the population of cooling designs to generate two new cooling designs from each random pair of designs forming a new population of cooling designs, evaluating the film cooling performance of each design of the new population of cooling designs; and selecting a set of the cooling designs that maximizes cooling effectiveness and minimizes area-averaged heat transfer over the high pressure surface side of the turbine vane.

10. The apparatus of claim 9, wherein the program code is further configured to:

repeat the providing, varying, evaluating, determining, selecting and randomly pairing steps until the optimization process is complete.

11. The apparatus of claim 9, wherein the program code is configured to select limits for the process variables is selected from a group consisting of: defining a range for each of the process variables, defining discrete possibilities of each of the process variable, and combinations thereof.

12. The apparatus of claim 9, wherein the program code is configured to evaluate each design by:

performing computational fluid dynamics simulations on each design of the plurality of designs.

13. The apparatus of claim 9, wherein each cooling hole design in the set of cooling hole designs is represented by a multidigit binary bit string.

14. The apparatus of claim 13, wherein the program code is configured to randomly pair by:

copying the multidigit binary bit string of a first design of the randomly paired designs to a random crossover point in the multidigit binary bit string;

filling in the remaining digits of the copied multidigit binary bit string with the multidigit binary bit string of a second design of the randomly paired designs to create a first new design of the new population of cooling designs;

copying the multidigit binary bit string of the second design of the randomly paired designs to the random crossover point in the multidigit binary bit string; and filling in the remaining digits of the copied multidigit binary bit string with the multidigit binary bit string of the first design of the randomly paired designs to create a second new design for the new population of cooling designs.

15. The apparatus of claim 14, wherein the program code is further configured to:

randomly mutate a subset of new cooling designs of the new population of cooling designs.

16. The apparatus of claim 15, wherein the program code is configured to mutate the subset of new designs of the new population of cooling designs by:
    changing a digit of the multidigit binary bit string of each new design of the subset of new cooling designs of the new population of cooling designs to the other of a one (1) and a zero (0).

17. A non-transitory computer readable medium, comprising:
    a program code configured to optimize cooling performance for turbomachinery components, the program code resident on the computer recordable type medium and further configured, when executed on a hardware implemented processor, to define a set of cooling hole designs, each design consisting of a predefined hole pattern including a plurality of different film cooling row patterns and placements which are a representative subset of a cooling hole pattern of an implementation pattern, and within each pattern there is axial and radial hole location variability;
    define a design space by selecting process variables and limits for film cooling of a turbomachinery component;
    defining sectors throughout the high pressure surface of a turbine vane,
    providing a random initial population of pressure side turbine vane cooling designs derived from the set of cooling hole designs by placing the implementation pattern represented by the predefined hole pattern of the cooling hole designs in any one of the sectors of the turbine vane;
    evaluate the film cooling performance each design of the initial population of designs;
    Varying the process variables across the design space; while iteratively performing in order:
    determine a fitness function value based on predicted heat transfer performance from 3-D CFD of each of the evaluated designs of the population of cooling deigns,
    select a half of the population of cooling designs having higher fitness function values,
    randomly pair designs of the selected half of the population of cooling designs to generate two new cooling designs from each random pair of designs forming a new population of cooling designs,
    evaluating the film cooling performance of each design of the new population of cooling designs; and
    selecting a set of the cooling designs that maximizes cooling effectiveness and minimizes area-averaged heat transfer over the high pressure surface side of the turbine vane.

18. The non-transitory computer readable medium of claim 17, wherein each design of the plurality of cooling designs is represented by a multidigit binary bit string, and wherein the program code is configured to randomly pair by:
    copying the multidigit binary bit string of a first design of the randomly paired designs to a random crossover point in the multidigit binary bit string;
    filling in the remaining digits of the copied multidigit binary bit string with the multidigit binary bit string of a second design of the randomly paired designs to create a first new design of the new population of cooling designs;
    copying the multidigit binary bit string of the second design of the randomly paired designs to the random crossover point in the multidigit binary bit string; and
    filling in the remaining digits of the copied multidigit binary bit string with the multidigit binary bit string of the first design of the randomly paired designs to create a second new design for the new population of cooling designs.

19. The non-transitory computer readable medium of claim 18, wherein the program code is further configured to:
    randomly mutate a subset of new cooling designs of the new population of cooling designs.

20. The non-transitory computer readable medium of claim 19, wherein the program code is configured to mutate the subset of new cooling designs of the new population of cooling designs by:
    changing a digit of the multidigit binary bit string of each new cooling design of the subset of new cooling designs of the new population of cooling designs to the other of a one (1) and a zero (0).

* * * * *